Dec. 5, 1950 E. G. O. ANDERSON ET AL 2,533,081
VIDEO-FREQUENCY RECEIVING APPARATUS
Filed Feb. 17, 1948
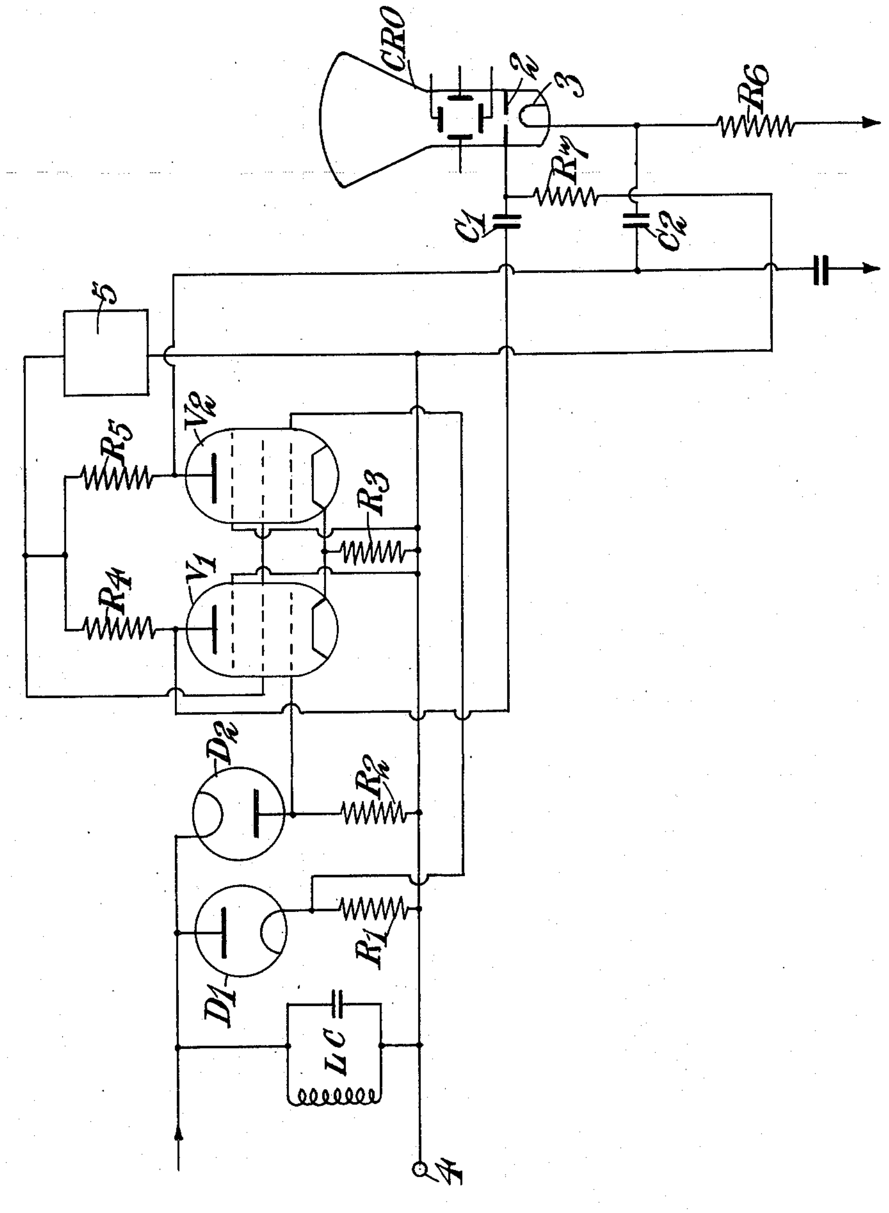
INVENTOR
E. G. O. Anderson
+ G. G. Bernard
By Watson, Cole, Grindle + Watson Patented Dec. 5, 1950 2,533,081

UNITED STATES PATENT OFFICE 2,533,081

VIDEO-FREQUENCY RECEIVING APPARATUS

Edward George Orme Anderson, West Wickham, and Geoffrey George Bernard, London, England, assignors to John Logie Baird Limited, London, England, a British company Application February 17, 1948, Serial No. 8,955
In Great Britain December 11, 1946

Section 1, Public Law 690, August 8, 1946
Patent expires December 11, 1966

6 Claims. (Cl. 315—22)

This invention relates to video-frequency receiving apparatus for modulating the beam current of a cathode-ray tube, for instance, for reconstituting a television picture.

In video-frequency receiving apparatus as at present used, it is difficult to obtain a sufficiently high output voltage over the required frequency range, owing to the high capacitance of the output circuit. In order to avoid an undesirable drop in the frequency-response characteristic at the higher end of the frequency range, it is necessary to use a low output resistance. Some improvement in the frequency-response characteristic is obtainable by means of chokes connected in series with the modulation load, but this does not entirely overcome the difficulty.

According to the present invention, a substantially increased beam modulation over a range of video-frequencies is obtained by applying a modulating voltage to a modulator electrode of the cathode-ray tube and simultaneously applying a modulating voltage of opposite sign to the cathode of the cathode-ray tube. The invention thus comprises a method of applying video-frequency modulating voltages to a cathode-ray tube which consists in applying two modulating voltages of opposite sign to a modulating electrode and the cathode respectively of the cathode-ray tube. The invention further comprises a video-frequency receiving apparatus having means arranged to obtain two modulation voltages in phase opposition with one another from a single input and to apply the said modulation voltages to a modulator electrode and the cathode respectively of a cathode-ray tube.

One arrangement according to the invention is illustrated diagrammatically in the accompanying drawing.

In the drawing, CRO indicates a cathode-ray tube which may be, for instance, the cathode-ray tube of a television receiver, the beam of which is to be modulated under the control of video-frequency receiving apparatus for the purpose of reconstituting the picture. The beam is deflected for scanning in known manner under the control of apparatus which need not be described herein.

The modulation of the beam is controlled by means of a pair of valves V1, V2. The cathodes of the valves V1 and V2 are connected through a common cathode-bias resistance R3 to a suitable source of negative potential marked 4 in the drawing and their anodes are connected through separate output resistances R4 and R5 to a positive HT supply 5 common to the two valves.

The anode of the valve V1 is connected through a coupling condenser C1 to the modulator electrode 2 whilst the anode of the valve V2 is connected through a coupling condenser C2 to the cathode 3. The valves V1 and V2 are thus arranged to operate in push-pull, their outputs being applied to two electrodes of the cathode-ray tube. A suitable resistance R6 is connected between the cathode 3 and the source from which the cathode 3 obtains its beam current, and the electrode 2 is connected through a suitable biassing resistance R3 to the negative supply conductor 4.

A tuned circuit LC is arranged to receive a radio-frequency signal provided by an incoming carrier wave. A pair of rectifying valves D1 and D2 and load resistances R1 and R2 are connected across the tuned circuit LC so as to demodulate the carrier wave signal and to obtain across the resistances R1 and R2 two video-frequency voltages of opposite sign. One of these voltages is applied to a control electrode of the valve V1 and the other is applied to the corresponding control electrode of the valve V2. The output signals which appear across the anode resistances R4 and R5 of the valves V1 and V2, and which are applied to the electrodes 2 and 3 respectively of the cathode-ray tube, are thus of opposite sign and reinforce one another in their effect on the beam modulation.

The load resistances R4 and R5 are of value so chosen, having regard to the capacitance of the output circuit, as to obtain a satisfactory frequency-response characteristic over the whole band width to be covered. Owing to the method of applying the modulating voltages to the cathode-ray tube, the value of each resistance R4 and R5 can be made sufficiently low to obtain a substantially uniform response over the whole band width whilst at the same time providing a sufficient output to modulate the cathode-ray tube fully.

The input to the tuned circuit LC may include both picture and synchronising information. In a television receiver, it is desirable to apply the complete picture and synchronising wave-form to the synchronising separator valves. Moreover, to facilitate complete separation, the sign of the synchronising signal should be positive when associated with negative picture signals. As the output of the modulation stage arranged in accordance with the present invention contains both positive and negative signals, it is a simple matter to connect the separator valve or valves to the appropriate point.

It is to be understood that the arrangement described with reference to the accompanying drawing is given by way of example only; and it is obvious that many modified arrangements could be employed for obtaining two modulation voltages of opposite sign and applying them to a modulator electrode and the cathode respectively of a cathode-ray tube so that they reinforce one another in their beam-modulating effect.

We claim:

1. A method of applying video-frequency modulating voltages to a cathode-ray tube which consists in simultaneously applying by means of a push-pull coupled amplifier stage two video signal modulation voltages of opposite sign to a modulator electrode and the cathode respectively of a cathode-ray tube.

2. Video-frequency receiving apparatus having a valve-coupled amplifier stage arranged to operate in push-pull to provide two video signal modulation voltages in phase opposition with one another from a single input, and circuit means to apply said modulation voltages simultaneously to a modulation electrode and the cathode respectively of a cathode-ray tube.

3. Video-frequency apparatus according to claim 2 wherein the amplifier stage is arranged to receive two video-frequency inputs of opposite sign from a common radio-frequency receiving circuit through the medium of two demodulators.

4. Video-frequency receiving apparatus comprising a cathode-ray tube and a valve-coupled video-frequency modulation stage arranged to operate in push-pull and having its two outputs coupled to a modulator electrode and the cathode respectively of a cathode-ray tube by means of output resistances sufficiently low to maintain a substantially uniform response over the band of video-frequencies for which the receiver is designed.

5. In a television receiver, the combination with a cathode-ray tube having a cathode and a modulator electrode, of a radio-frequency receiving circuit, a pair of modulators coupled to said radio frequency receiving circuit to provide two video frequency signals of opposite sign, two valve amplifier stages coupled respectively to said demodulators to provide two modulation voltages in phase opposition, and means for simultaneously applying said two modulation voltages to the cathode and modulator electrode respectively of the cathode-ray tube.

6. In a television receiver, the combination with a cathode-ray tube having a cathode and a modulator electrode, of a radio frequency receiving circuit, demodulating means coupled to said receiving circuit to produce video-frequency signals, a valve amplifier stage coupled to said demodulating means to provide two modulation voltages in phase opposition, and means for simultaneously applying said two modulation voltages to the cathode and modulator electrode respectively of the cathode-ray tube.

EDWARD GEORGE ORME ANDERSON.
GEOFFREY GEORGE BERNARD.

REFERENCES CITED

The following references are of record in the file of this patent:

UNITED STATES PATENTS

| Number | Name | Date |
|---|---|---|
| 2,121,359 | Luck et al. | June 21, 1938 |
| 2,153,638 | Norman | Apr. 11, 1939 |
| 2,221,115 | Shepard, Jr. | Nov. 12, 1940 |
| 2,280,524 | Hansen | Apr. 21, 1942 |
| 2,280,531 | Norgaard | Apr. 21, 1942 |
| 2,296,050 | Poch | Sept. 15, 1942 |
| 2,430,699 | Berkoff | Nov. 11, 1947 |
| 2,432,196 | Hershberger | Dec. 9, 1947 |
| 2,449,792 | Snyder, Jr. | Sept. 21, 1948 |